United States Patent [19]

Yip et al.

[11] Patent Number: 5,694,344

[45] Date of Patent: Dec. 2, 1997

[54] METHOD FOR ELECTRICALLY MODELING A SEMICONDUCTOR PACKAGE

[75] Inventors: Wai-Yeung Yip, Ventura, Calif.; Arijit Chandra, Gilbert, Ariz.

[73] Assignee: Motorola, Inc., Schaumburg, Ill.

[21] Appl. No.: 491,195

[22] Filed: Jun. 15, 1995

[51] Int. Cl.$^6$ ................................................. G06F 17/50
[52] U.S. Cl. ........................................... 364/578; 364/488
[58] Field of Search ........................... 395/500; 364/488, 364/489, 490, 578

[56] References Cited

U.S. PATENT DOCUMENTS

| 4,866,507 | 9/1989 | Jacobs et al. | 361/412 |
| 5,081,602 | 1/1992 | Glover | 364/578 |
| 5,103,415 | 4/1992 | Omura et al. | 364/578 |
| 5,243,547 | 9/1993 | Tsai et al. | 364/578 |
| 5,326,932 | 7/1994 | You | 361/730 |

OTHER PUBLICATIONS

"Methods of Calculation of Electrical Parameters for Electronic Packaging Applications" by Michael R. Scheinfein and Olgierd A. Palusinski, ISSN 0740–6797/88, copyright 1988 The Society for Computer Stimulation, vol. 4, No. 3, pp.187–254.

*Primary Examiner*—Vincent N. Trans
*Attorney, Agent, or Firm*—Robert D. Atkins

[57] ABSTRACT

A method of electrically modeling a semiconductor package is provided. The method reduces computation time for mutual inductance calculations between interconnect lines of the semiconductor package. Only interconnect within a predetermined distance of an interconnect line being modeled is calculated for mutual inductance. The predetermined distance is selected such that any interconnect line greater than the predetermined distance away from the interconnect line being modeled produces a negligible or small mutual inductance. This greatly reduces the number of calculations for semiconductor packages having a large number of interconnect lines. Each interconnect line modeled is broken into segments for calculating mutual inductance. An algorithm is used that calculates the mutual inductance between a pair of arbitrarily oriented straight line metal segments. The algorithm requires a single integration which significantly reduces computation time when compared with systems solving Maxwell's equation in three dimensions.

12 Claims, 5 Drawing Sheets

5,694,344

METHOD FOR ELECTRICALLY MODELING A SEMICONDUCTOR PACKAGE

BACKGROUND OF THE INVENTION

This invention relates, in general, to semiconductor packages, and more particularly, to systems for providing an electrical characterization of a semiconductor package.

A semiconductor package houses and protects semiconductor devices from an environment external to the package. A semiconductor package also provides electrical interconnection from the semiconductor devices it houses to points external to the package. In general, semiconductor packages are increasingly complex. In fact, semiconductor packages are developed along with higher density wafer process flows to ensure pin counts and performance can be provided.

It is well known that the scale of semiconductor integration has advanced to the point that hundreds of thousands to millions of logic gates are offered on a single semiconductor chip. The operating speed or performance of a semiconductor chip has also increased with the level of integration. Package technology has kept pace with semiconductor technologies. Semiconductor packages currently offer higher pin counts, greater power dissipation, more protection, and higher speeds than packages of just a few years ago.

Development of a semiconductor package is a complex process in design and manufacturing. Computer Aided Design (CAD) tools, similar to that used in integrated circuit design, are required to simulate a semiconductor package prior to manufacture. A model of the electrical characteristics is especially useful in determining if a package will meet performance parameters before a prototype is made.

It would be of great benefit if a system and method could be provided that accurately models a semiconductor package and reduces development time.

DETAILED DESCRIPTION OF THE DRAWINGS

Figure 1:
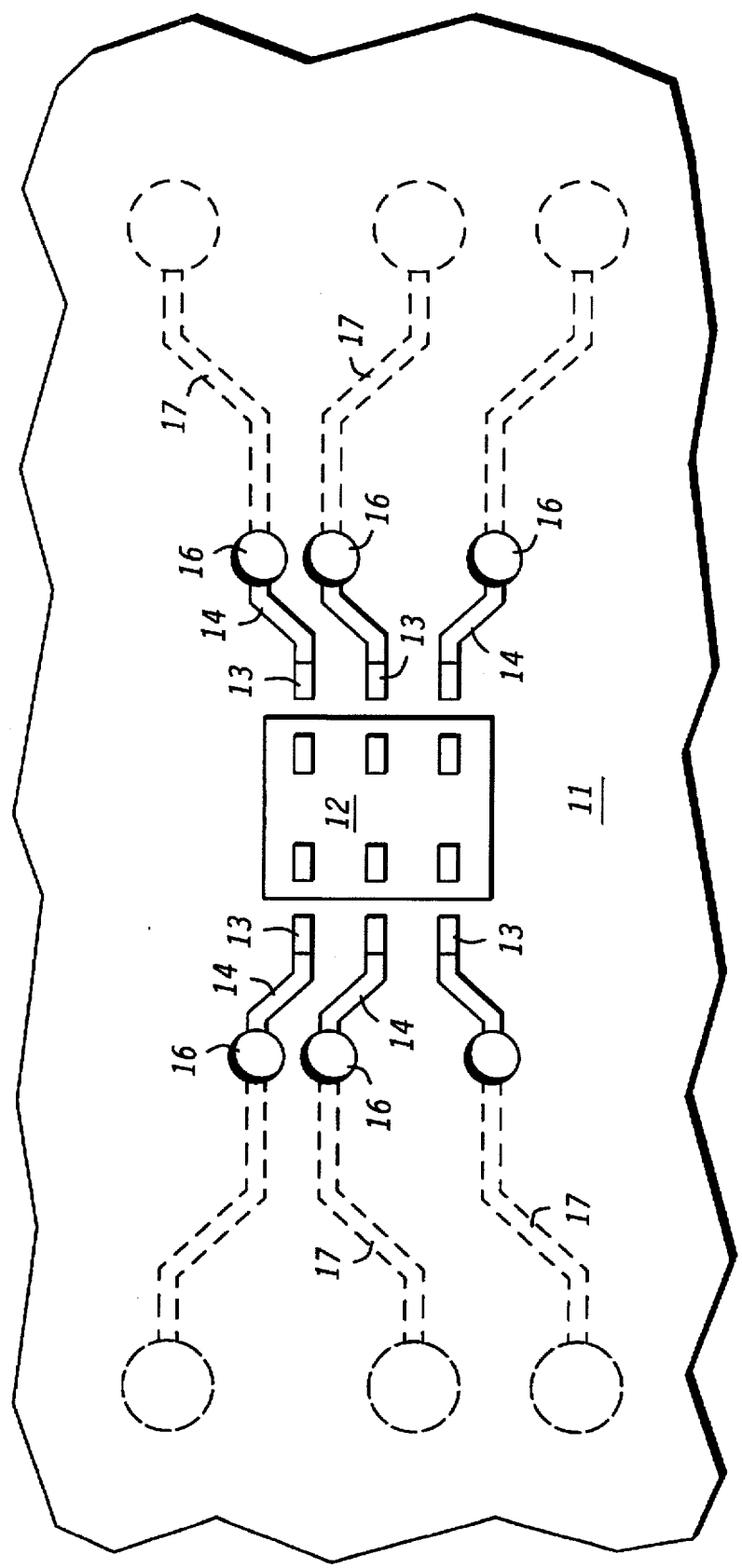
FIG. 1 is a top view of a semiconductor package having two layers of interconnect.

It is well known that many different types of semiconductor packages are currently being offered by semiconductor companies to meet various customer needs. Development of new types of packages is increasing at a rapid pace to meet performance and density criteria of the next generation wafer process flows. Some examples of packages currently being offered are Tape Automated Bonding (TAB), lead frame packages, and Ball Grid Arrays (BGA). All semiconductor packages protect a semiconductor device and provide interconnect from an integrated circit to points external to the semiconductor package. Modeling an electrical interconnect of a semiconductor package before building a prototype or starting manufacture is essential to analyze worst case interconnect paths to ensure performance goals are met. It is also important to characterize the entire semiconductor package after design has been completed to allow optimization of pad layout of the semiconductor chip for best performance. The interconnect of a semiconductor package is modeled as a resistance, capacitance, and inductance. Mutual capacitance and mutual inductance is also modeled between interconnect lines. Simulations of the model are run to determine the performance characteristics of the semiconductor package.

A semiconductor package, for example, a Ball Grid Array (BGA) has an extremely complex interconnect scheme. A Ball Grid Array has hundreds of pads on a bottom surface of the package for coupling to a circuit board. Each pad of the BGA package includes a solder ball for coupling to a corresponding pad of the circuit board. The package includes one or more layers of metal for coupling the integrated circuit to the pads. Metal interconnect of different metal layers are coupled together through an etched via or plated through hole.

A problem with high pin counts and multiple interconnect levels in modeling a semiconductor package is that each interconnect interacts with all other interconnect of the semiconductor package. A computer model of the semiconductor package not only includes electrical characteristics of the interconnect itself but is also modeled with all mutual effects between all other interconnects on any interconnect level. For example, a paper titled "Methods of Calculation of Electrical Parameters for Electronic Packaging" by Michael R. Scheinfein and Olgierd A. Palusinski, published in the Transactions of The Society of Computer Simulation, 1988, Volume 4, Number 3, pages 187–254, and hereby incorporated by reference discloses a method for generating electrical models of a semiconductor package. One modeling method disclosed generates an electrical model for selected interconnects of the semiconductor package by solving the time dependent Maxwell's equations in three dimensions. Assumptions are made in analyzing only selected interconnects and thus are prone to error that would not occur if each interconnect of the semiconductor package was modeled.

The problem with a three dimensional field solver using Maxwell's equations is the simulation time and the amount of memory required. Large matrices are generated in the problem solving process due to the interaction of each interconnect with every other interconnect in the semiconductor package. For large pin counts and multiple levels of interconnect it is possible to run out of memory during computation or at a minimum require a simulating system having a prohibitively large memory reserve. Yet, all interconnect should be simulated to determine worst case numbers for a semiconductor package. Simulation time for generating electrical characteristics of a complex semiconductor package can run weeks or months which can impact a development cycle of a semiconductor package, especially if several redesigns are required.

A semiconductor package modeling tool, to be effective, requires a quick turnaround time in the simulation of the semiconductor package. For example, a typical semiconductor package development process includes laying out a semiconductor package on a Computer Aided Design (CAD)

tool, analysis of worst case paths, modification or redesign of the semiconductor package to meet performance criteria. It is obvious that a simulation program taking weeks or months to run would greatly increase the design cycle time of the package design, especially if many redesigns or modifications are required. A prototype is then developed and evaluated to insure performance. Manufacture of the semiconductor package begins after the prototype is approved.

Clearly, a method to reduce cycle time in the development of a semiconductor package requires a reduction in simulation time. The main area that affects simulation time is the calculation of mutual inductances between interconnect of a semiconductor package. A first step in reducing the simulation time required to model a semiconductor package involves limiting calculation of mutual inductance to interconnect within a predetermined distance from an interconnect being modeled. Interconnect outside the predetermined distance is assumed to provide negligible mutual inductance. A second step in reducing the simulation time required to model a semiconductor package involves using an algorithm that estimates mutual inductance. The algorithm is fast because it requires only one integration of a closed formula whereas a three dimensional simulation solving Maxwell's equation requires three integrations. The net result is at least a ten time reduction in simulation time and a similar reduction in computer requirements such as memory.

FIG. 1 is a top view of a semiconductor package 11 having electrical interconnect formed on two different layers. Semiconductor package 11 has a reduced number of pads to simplify illustration of the electrical interconnect. Interconnect lines of semiconductor package 11 couple Input/Output (I/O) pads of an integrated circuit 12 to corresponding pads 13 of semiconductor package 11. In the preferred embodiment, wire is bonded to an I/O pad of integrated circuit 12 and an interconnect line of semiconductor package 11. Pads 13 are the external connection points of semiconductor package 11. Metal lines 14 couple between pads 13 and vias 16. Vias 16 couple metal lines 14 to metal lines 17. Metal lines 14 and 17 are formed on a different layer of semiconductor package 11. Typically an electrical isolating layer is formed between layers in which electrical interconnect is formed. Metal lines 17 couple to vias 16 and extend to a point near the integrated circuit. Metal lines 17 provide a metal pad area for connection to integrated circuit 12, for example, through a wire bond, tape automated bonding (TAB), or solder bump. Note that metal lines 14 and 17 comprise metal segments coupled together to form an interconnect line.

Figure 2:
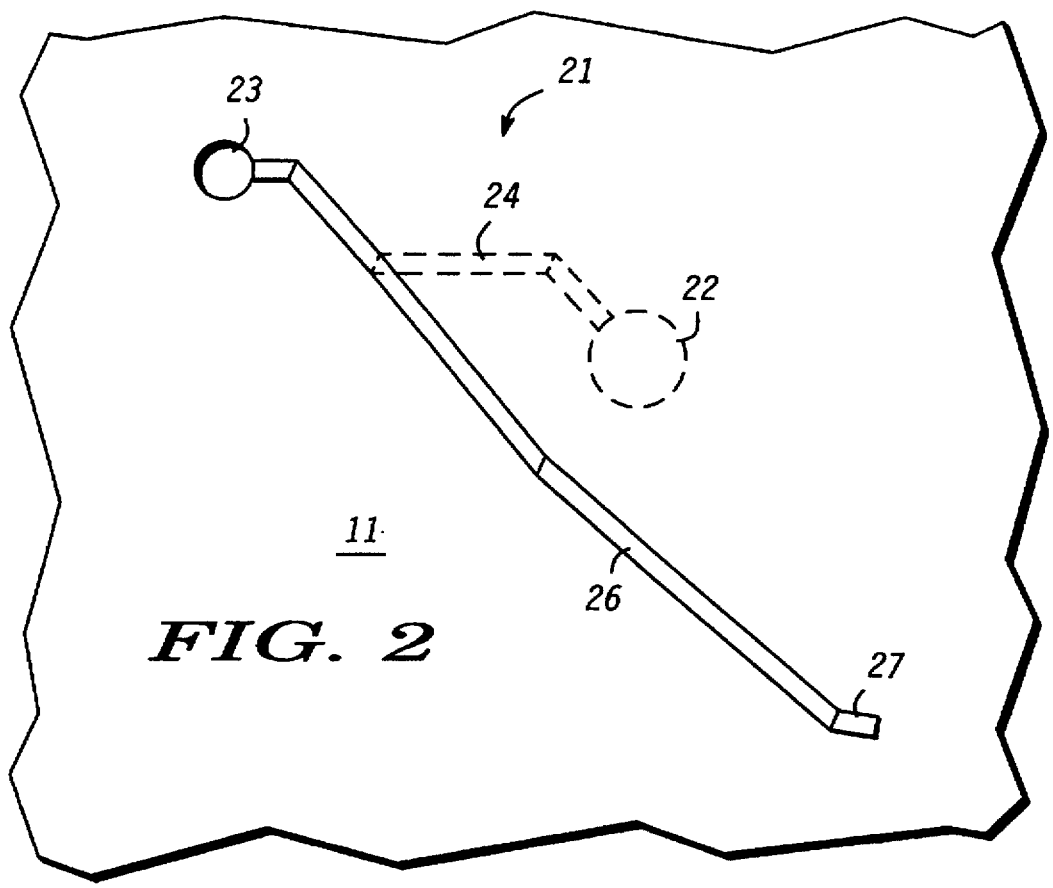
FIG. 2 is an illustration of an interconnect line of a semiconductor package.

FIG. 2 is a diagram of an isolated electrical interconnect line 21 of a semiconductor package corresponding to the electrical interconnect of FIG. 1. A pad 22 is coupled to a via 23 by a line 24. A line 26 couples to via 23 and extends to an endpoint 27. Endpoint 27 is a coupling point from the semiconductor package to an integrated circuit. Lines 24 and 26 are formed on different layers of the semiconductor package. FIG. 2 clearly shows how lines 24 and 26 are formed in segments.

Figure 3:
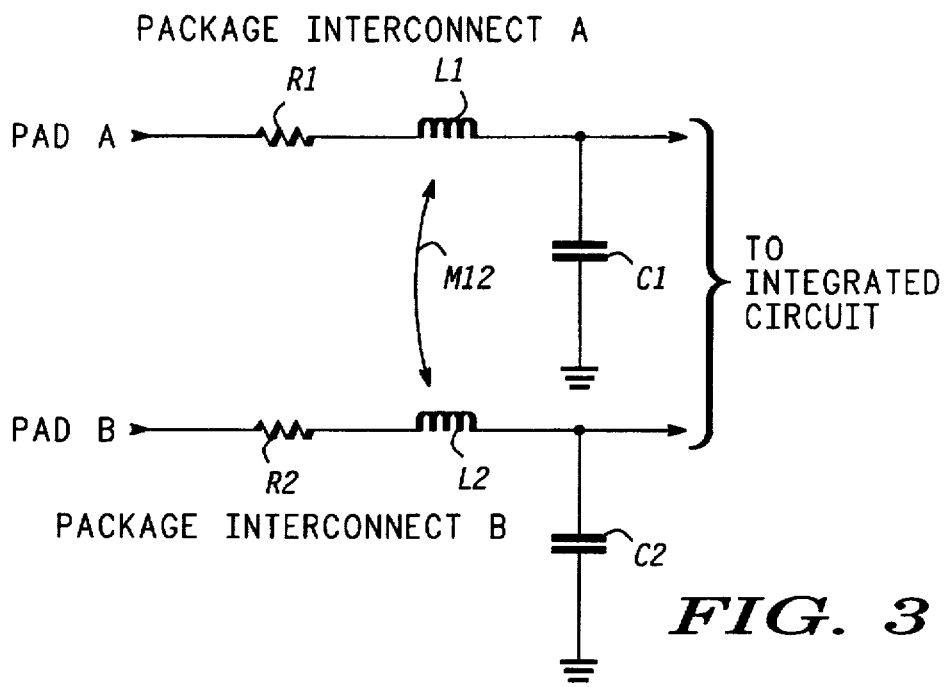
FIG. 3 is an electrical model of two interconnect lines of a semiconductor package.

FIG. 3 is a schematic diagram of an electrical model of two interconnect lines of a semiconductor package. A semiconductor package modeling program receives a file with a physical description of a semiconductor package and calculates a model comprising a resistor, inductor, and capacitor based on the properties of the conducting material, dielectric material, and the interconnect layout. The semiconductor package modeling program also calculates mutual inductance between interconnect lines of the semiconductor package.

Illustrated in FIG. 3 are electrical representations of two interconnect lines of a semiconductor package respectively coupled to a PAD A and a PAD B. A first electrical interconnect line model comprises a resistor R1, an inductor L1, and a capacitor C1 coupled in series. A second electrical interconnect line model comprises a resistor R2, and inductor L2, and a capacitor C2 coupled in series. The interconnect lines couple together inductively, thus a term M12 corresponds to the mutual inductance between the two interconnect lines. Prior art semiconductor package modeling programs using a three dimensional Maxwell equation solver calculates a mutual inductance with every interconnect line in the package.

Figure 4:
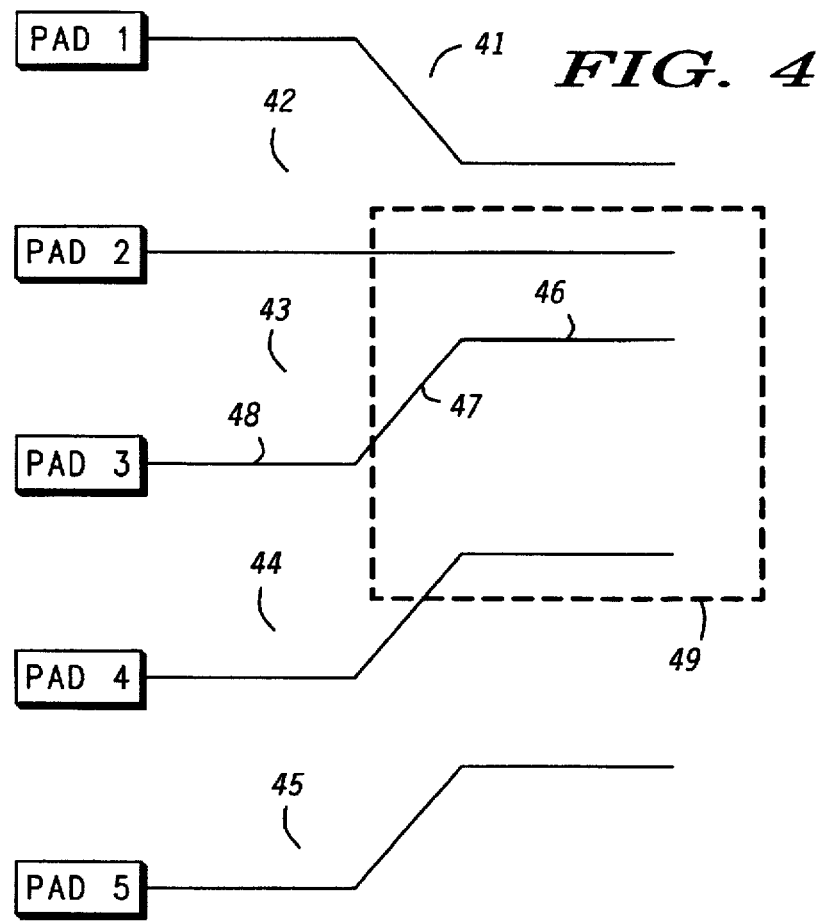
FIG. 4 is an illustration of interconnect lines of a semiconductor package showing a boundary for determining interconnect lines within a predetermined distance from a segment being modeled in accordance with the present invention.

FIG. 4 is a diagram of semiconductor package interconnect illustrating segmentation of an interconnect line and calculating mutual inductance within a predetermined distance of a segment being modeled. For illustration purposes, interconnect lines 41–45 are planar to one another (formed on the same layer) and respectively couple to PADs 1–5.

A physical layout of a semiconductor package is generated on a Computer Aided Design (CAD) tool. The CAD tool stores a description of the semiconductor package that can be viewed on a screen or used in the manufacturing process. Data points which describe a location of an interconnect line and other information needed to reproduce the interconnect shapes are stored in a file. The description of the semiconductor package is used to determine interconnect lengths and the proximity of one interconnect to another. In particular, interconnect lines drawn on a CAD tool are typically formed in segments. A segment is a portion of an interconnect line that is straight. For example, interconnect line 43 comprises three segments identified as a segment 46, a segment 47, and a segment 48. Segment 48 couples to PAD 3.

In general, the interconnect lines which form the interconnect of a semiconductor package have an inductance that is a first order function of metal cross-sectional dimensions and the location of the ground plane. Typically, the interconnect consists of serially connected straight line segments, each with uniform or near uniform cross-sectional dimensions thereby allowing an inductance per unit length to be calculated for the conductive lines of a conductive layer (a semiconductor package may have several layers of interconnect). The total self inductance of a metal line or interconnect is calculated by multiplying the length of the interconnect by the inductance per unit length. In the preferred embodiment, the self inductance is calculated for each segment of an interconnect line. For example, the self inductance of interconnect line 43 is the sum total of the self inductances of segments 46–48 wherein the self inductance of each segment is determined by the length of the segment and the inductance per unit length for the interconnect segment. The self inductance calculation described above does not include mutual inductance between other lines or mutual inductance between segments of the same interconnect line.

Resistance and capacitance are calculated using well known techniques. As mentioned previously, the cross-sectional dimensions of the interconnect are uniform. A resistance per unit length is either measured empirically or calculated based on the cross-sectional dimensions and the material resistivity. The resistance of an interconnect line of a semiconductor package is the length of the interconnect multipled by the resistance per unit length.

A capacitance is formed by the interconnect as a first plate and a ground plane of a semiconductor package as second plate. The dielectric constant of any layers between the first and second plates are required for the capacitance calculations. Sidewall capacitance of the interconnect is also calculated to increase accuracy. If mutual capacitance between interconnect lines is significant it also can be calculated using data from the physical layout. Typically, mutual inductance has a larger effect than mutual capacitance.

An interconnect line is broken into segments to simplify calculation of the mutual inductance between the interconnect line and other interconnect lines of a semiconductor package. A calculation requiring a single integration is used to significantly reduce the computation of mutual inductance. The calculation uses an algorithm that is accurate for calculating mutual inductance between two straight line segments. A reduction in the number of calculations is accomplished by limiting the mutual inductance calculations to segments of other interconnect lines within a predetermined distance of the segment being analyzed. The predetermined distance is determined through simulation or empirical means. For example, a test package is designed to evaluate interconnect inductance. Interconnect lines are placed at varying distances (including different metal layers) and electrically tested to determine an inductance of an interconnect line and mutual inductance values at various distances away from the interconnect line. A distance from another interconnect line that yields a value of mutual inductance that is considered a small percentage of the total inductance of the interconnect is empirically chosen to be the predetermined distance. Similarly, the predetermined distance can be determined through simulation using the same scenario.

In FIG. 4, segment 46 is being modeled for mutual inductance. A square 49 is formed around segment 46 having a boundary indicated by dashed lines. Square 49 is a two dimensional figure since all the interconnect is formed on the same plane. The concept is easily extended to three dimensions if multiple layers of interconnect are used. Square 49 describes an area around segment 46 in which interconnect is approximately a predetermined distance from segment 46. Interconnect that does not fall within or intersect the boundary of square 49 is assumed to have a negligible mutual inductance with segment 46. Different shapes are acceptable for providing a boundary for defining which interconnect is calculated for mutual inductance. Any portion of any interconnect within the boundary implies that each segment of that interconnect is calculated for mutual inductance, even the portions of the interconnect that are not within the boundary of square 49. Thus, all segments of interconnect lines 42 and 44 are calculated for mutual inductance with segment 46.

For example, a ball grid array package with 313 pins has a physical dimension of approximately 35 millimeters square and 0.4 millimeter substrate thickness. A predetermined distance of 6 millimeters effectively eliminates calculation on 75% of the interconnect lines for each interconnect line being modeled. An interconnect line approximately 6 millimeters from the interconnect line being modeled has cross-talk of less than a tenth of a percent.

As mentioned previously, coordinate data of the physical location of each interconnect of a semiconductor package is stored in a CAD tool. An interconnect of the semiconductor package is identified to be modeled or evaluated. The interconnect is broken into segments determined by the coordinate data describing the interconnect. A program identifies interconnect within a predetermined distance from the segment being modeled. The program creates a bounded volume, for example a box, around the segment being modeled. Any point on the boundary of the bounded volume is the predetermined distance (or greater) from the segment. The program compares coordinate locations of interconnect of the semiconductor package to the boundary of the bounded volume and determines which interconnect is within or intersects the boundary of the bounded volume. Mutual inductance of the identified interconnect and the inteconnect intersecting or within the boundary is then calculated.

A significant reduction in computation time is achieved in the calculation of the mutual inductance between a segment being modeled and the identified interconnect by limiting the number of interconnect being evaluated. This is especially true for high pin count semiconductor packages that utilize multiple interconnect layers. In the preferred embodiment, the interconnect identified within the bounded volume is also broken into segments. Mutual inductance is thus calculated between the segment being modeled and any segment identified within the bounded volume. The algorithm developed estimates mutual inductance between a pair of arbitrarily oriented straight line segments. The algorithm is derived using Biot-Savart's Law and calculates inductance based on flux linkage. An assumption is made that the current carrying conductor is a line conductor which is generally valid for mutual inductance calculations.

Figure 5:
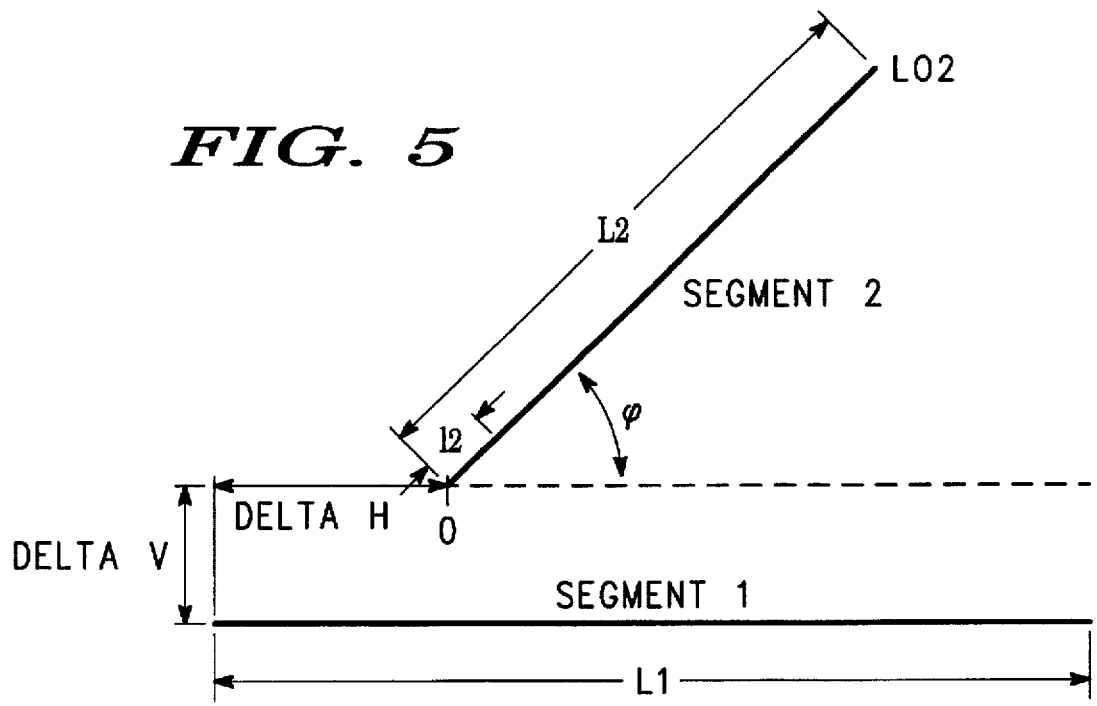
FIG. 5 is an illustration of two arbitrarily oriented segments of a semiconductor package in accordance with the present invention.

FIG. 5 is an illustration of two arbitrarily aligned segments showing information used to calculate mutual inductance. Segment 1 is the segment being modeled and Segment 2 is a segment within the predetermined distance from Segment 1. It is well known that semiconductor package interconnect is typically formed co-planar to a substrate in which the integrated circuit is attached and to any ground of the semiconductor package. Multiple layers of metal are also co-planar to one another having an electrical isolation layer between metal layers. Segment 1 and Segment 2 are formed on different metal layers of the semiconductor package. Segment 1 and Segment 2 respectively have a length L1 and L2. Delta V (vertical displacement) is the distance between Segment 1 and the closest endpoint of Segment 2 (identified as endpoint 0). Delta H (horizontal displacement) is the distance between the closest endpoint of Segment 1 to the endpoint 0 of Segment 2. The endpoint of Segment 2 farthest from Segment 1 is identified as endpoint L02. A dashed line runs parallel to Segment 1 and intersects endpoint 0. An angle between the dashed line and Segment 2 is identified as theta. 12 is the distance of differential element along line segment 2 from end point 0. A first term $x_2$ is described in equation 1 listed below.

$$x_2 = \text{Delta } H + 12 * \cos(\text{theta}) \qquad \text{(equation 1)}$$

A second term $y_2$ is described in equation 2 listed below.

$$y_2 = \text{Delta } V + 12 * \sin(\text{theta}) \qquad \text{(equation 2)}$$

Figure 6:
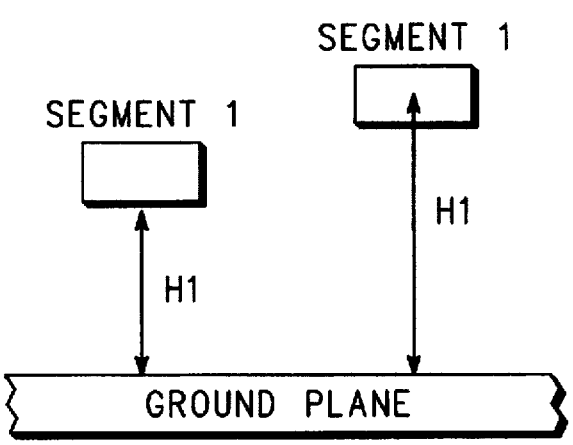
FIG. 6 is a cross-sectional view illustrating two segments of a semiconductor package having different heights from a nearest ground plane.

FIG. 6 is a cross-sectional view of Segment 1 and Segment 2 illustrating the fact that they are formed on different metal layers of a semiconductor package. Segment 1 is a height H1 from the ground plane of the semiconductor package. Segment 2 is a height H2 from the ground plane of the semiconductor package. In the case where no groound plane is present in the package, H1 and H2 are measured from the ground plane nearest to the segments, for example, it is measured to the printed circuit board in which the semiconductor package is coupled. The algorithm used to calculate mutual inductance is listed below in equation 3. Computation of equation 3 is fast because only a single integration of a closed formula is required. Equation 3 is easily implemented on a computer in conjunction with the physical description of a semiconductor package for providing position information on interconnect.

$$M = 0.1\cos(\text{theta}) * \int_{L2} \ln\left[ \frac{\{(L1-x2) + \sqrt{(L1-x2)^2 + y2^2 + (H1-H2)^2}\}}{\{-x2 + \sqrt{x2^2 + y2^2 + (H1-H2)^2}\}} \cdot \frac{\{-x2 + \sqrt{x2^2 + y2^2 + (H1+H2)^2}\}}{\{(L1-x2) + \sqrt{(L1-x2)^2 + y2^2 + (H1+H2)^2}\}} \right] dl2 \quad \text{(equation 3)}$$

Figure 7:
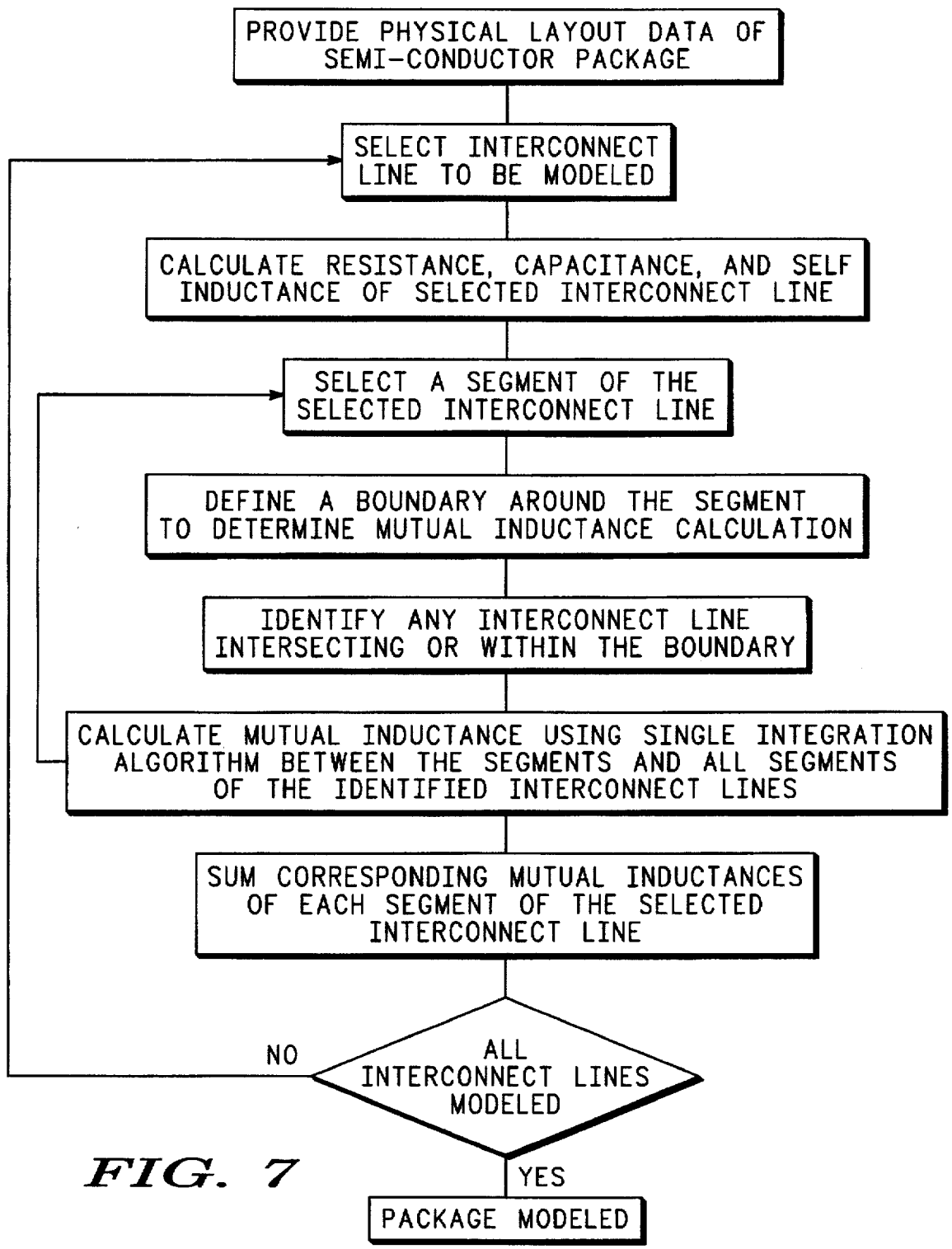
FIG. 7 is a flow diagram of a method for electrically modeling a semiconductor package in accordance with the present invention.

FIG. 7 is a flow diagram 61 illustrating a modeling process for the interconnect lines of a semiconductor package. The process for modeling the semiconductor package includes providing a physical layout description of the semiconductor package. The physical layout description has coordinate locations of the interconnect lines which are used to determine the proximity and angle relationship between segments of the interconnect lines.

A first step is the selection of an interconnect line to be modeled. In the preferred embodiment, the selected interconnect line is formed in straight line segments. The resistance, capacitance, and self inductance of the selected interconnect line is then calculated.

A second step is to select a segment for modeling mutual inductance of the selected interconnect line. A boundary is formed around the segment. The boundary defines the interconnect lines of the semiconductor package that are to be calculated for mutual inductance. A program determines which interconnect lines intersect or are within the boundary defined around the segement. Any point on the boundary is at least a predetermined distance from a closest point of the segment. An interconnect line a distance greater than the predetermined distance from the segment produces a neglible mutual inductance that is not calculated. Mutual inductance between segments of the selected interconnect can also be calculated.

In the preferred embodiment, a mutual inductance is calculated between the selected segment and each segment of the interconnect lines intersecting or within the defined boundary (this includes segments of the intersecting interconnect lines outside the boundary). An algorithm that uses a single integration significantly reduces computation time in the calculation of mutual inductance. The algorithm is based on Biot-Savart's Law as described hereinabove. The algorithm is accurate for calculating mutual inductance between two segments. The mutual inductance values are stored in a file.

The mutual inductances for each segment of the selected interconnect are similarly calculated. Corresponding mutual inductances of the segments of the selected interconnect line are summed together forming a model of the mutual inductances of the selected interconnect line. A final step is to repeat the process for each interconnect line of the semiconductor package.

By now it should be appreciated that a method for modeling a semiconductor package has been provided. A physical description of a semiconductor package on a computer system is used to develop an electrical model. Interconnect of the semiconductor package is modeled as a resistance, capacitance, and inductance. An interconnect line is broken into segments for a calculation of mutual inductance between other interconnect lines. Mutual inductance is calculated between a selected interconnect line and other interconnect lines within a predetermined distance of the selected interconnect line. In the preferred embodiment, a boundary is defined around a segment of the selected interconnect line. The boundary is at least the predetermined distance away from the segment. Any interconnect line intersecting or within the boundary is calculated for mutual inductance. The predetermined distance is chosen such that interconnect lines greater than the predetermined distance produce a negligible mutual inductance with selected interconnect line. Eliminating interconnect lines for calculations of mutual inductance produces a substantial reduction in computation time for semiconductor packages having a large number of interconnect lines.

A further reduction in computation time is achieved using an algorithm requiring a single integration. The algorithm is accurate for calculation of mutual inductance between two segments. Thus, each segment of the selected interconnect line is calculated for mutual inductance with each segment of the interconnect lines within the predetermined distance of each segment. Corresponding mutual inductances of each segment are added together to form a mutual inductance model of the selected interconnect line.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A method for generating an electrical model of semiconductor package comprising the steps of:

providing a physical description of the semiconductor package;

selecting an interconnect line of the semiconductor package to be modeled;

identifying interconnect lines of the semiconductor package within a predetermined distance from said selected interconnect line;

modeling a resistance, capacitance, and a self inductance of said selected interconnect line; and calculating mutual inductance between said selected interconnect and said interconnect within said predetermined distance of said selected interconnect line wherein interconnect lines of the semiconductor package more than said predetermined distance away from said selected interconnect line are not calculated for mutual inductance with said selected interconnect line.

2. The method as recited in claim 1 further including a step of identifying segments which form said selected interconnect line.

3. The method as recited in claim 2 further including the steps of:

selecting a segment of said selected interconnect line; and defining a boundary around said selected segment wherein said boundary is at least said predetermined distance from a closest point of said selected segment.

4. The method as recited in claim 3 wherein said step of identifying interconnect lines of the semiconductor package within a predetermined distance from said selected interconnect line includes a step of determining which interconnect lines of the semiconductor package reside within or intersect said boundary.

5. The method as recited in claim 4 wherein said step calculating mutual inductance includes a step of:

using an algorithm requiring a single integration for calculating a mutual inductance between said selected segment and each segment of said interconnect lines of the semiconductor package which reside within or intersect said boundary wherein said algorithm calculate mutual inductance between a pair of arbitrarily oriented straight line segments.

6. The method as recited in claim 4 further including the steps of:

repeating calculations for mutual inductance of each segment of said selected interconnect line; and summing corresponding mutual inductances of each segment of said selected interconnect line for building a model of mutual inductances of said selected interconnect line.

7. The method as recited in claim 4 further including the steps of:

repeating the step of modeling a resistance, a capacitance, and a self inductance for each interconnect line of the semiconductor package; and repeating the step of calculating mutual inductance for each interconnect line of the semiconductor package.

8. A method for electrically modeling a semiconductor package comprising the steps of:

providing a physical description of the semiconductor package;

calculating mutual inductance between interconnect lines within a predetermined distance from one another, interconnect lines of the semiconductor package greater than said predetermined distance are not calculated for mutual inductance thereby reducing computation time; and calculating mutual inductance between straight line segments of interconnect lines of the semiconductor package wherein an algorithm that requires a single integration is used for calculating mutual inductance between a pair of arbitrarily oriented straight line segments and wherein an orientation between segments is determined from said description of said physical layout of the semiconductor package.

9. The method as recited in claim 8 wherein said step of calculating mutual inductance between interconnect lines within a predetermined distance from one another includes a step of determining said predetermined distance as a point where a mutual inductance between a segment of an interconnect line being modeled and another segment is less than one percent of a self inductance of said segment.

10. The method as recited in claim 8 further including a step of calculating a resistance, a capacitance, and a self inductance of each interconnect line of the semiconductor package.

11. The method as recited in claim 9 further including the steps of:

selecting an interconnect line to be modeled for mutual inductance;

segmenting said selected interconnect line;

selecting a segment to be modeled for mutual inductance;

identifying any interconnect lines within said predetermined distance of said selected segment;

calculating mutual inductance between said selected segment and segments of said identified interconnect lines within said predetermined distance;

repeating said steps of identifying and calculating for each segment of said selected interconnect line;

summing corresponding mutual inductances of each segment of said selected interconnect line; and generating an electrical model of said selected interconnect line from said resistance, capacitance, self inductance, and mutual inductances of said selected interconnect line.

12. The method as recited in claim 11 further including a step of:

repeating the steps of claim 11 for each interconnect line of the semiconductor package.

* * * * *